United States Patent

[11] 3,614,632

[72] Inventors Lawrence M. Leibowitz
Fairfax, Va.;
Richard K. Baldauf, Greenbelt, Md.

[21] Appl. No. 80,652
[22] Filed Oct. 14, 1970
[45] Patented Oct. 19, 1971
[73] Assignee The United States of America as represented by the Secretary of the Navy

[54] DIGITAL PULSE WIDTH GENERATOR
4 Claims, 1 Drawing Fig.

[52] U.S. Cl. 328/58, 307/215, 307/221, 307/224, 307/265, 328/37, 328/48, 328/92
[51] Int. Cl. H03k 5/04
[50] Field of Search 307/220–226, 267, 215; 328/37–48, 58, 92

[56] References Cited

UNITED STATES PATENTS 3,002,151 9/1961 Brodgrick et al. 328/48 X
3,539,926 11/1970 Breikss 307/265

*Primary Examiner*—Stanley D. Miller, Jr.
*Attorneys*—R. S. Sciascia, Arthur L. Branning, James G. Murray and Sol Sheinbein

ABSTRACT: Logic circuitry for generating a pulse of width *n* units of time where *n* is any positive integer.

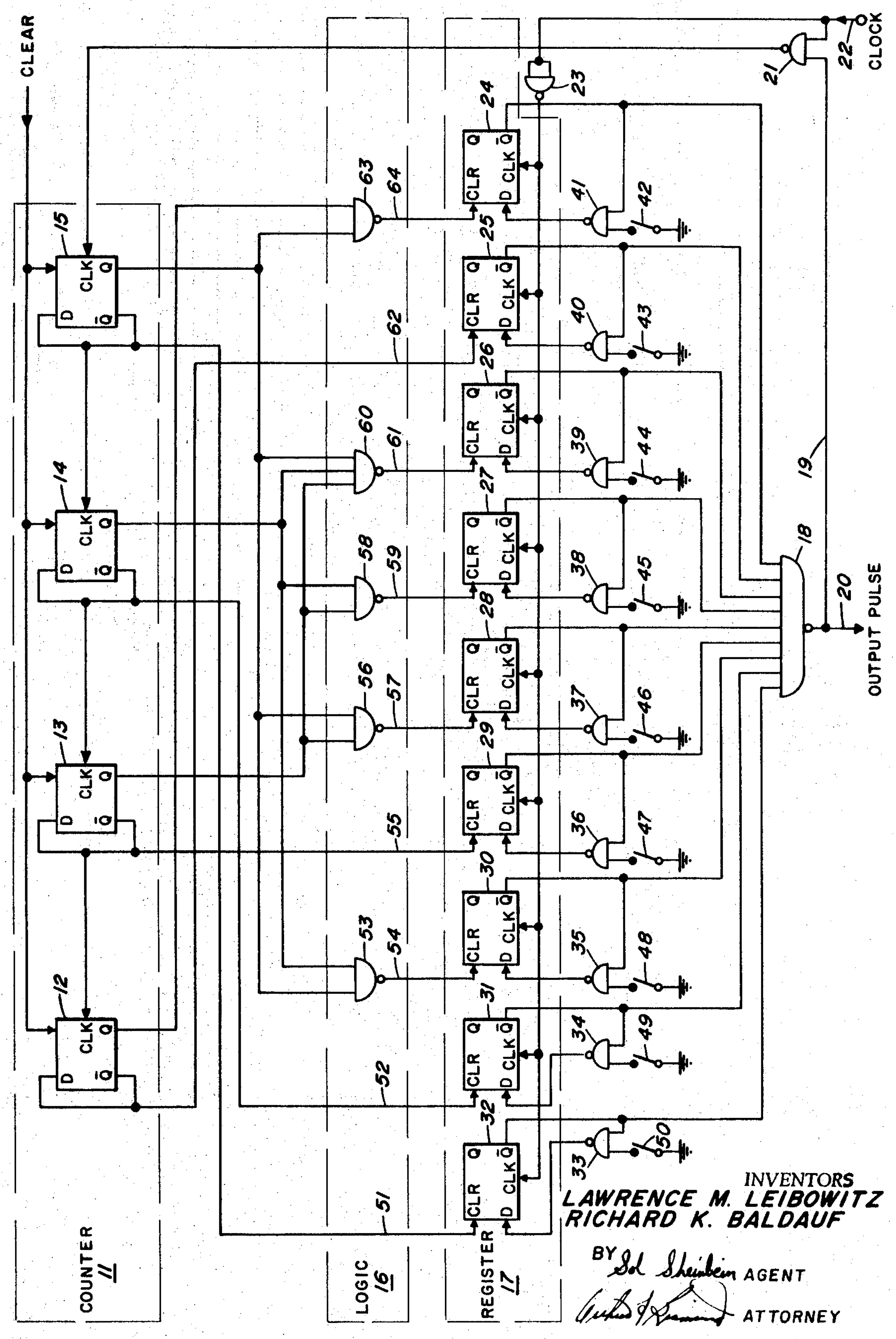
INVENTORS
LAWRENCE M. LEIBOWITZ
RICHARD K. BALDAUF
BY Sol Sheinbein AGENT
ATTORNEY

DIGITAL PULSE WIDTH GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There are many applications in digital systems that require the generation of a pulse of predetermined width. The basic circuits used to generate such a pulse include monostable multivibrators and pulse counters.

The use of a monostable multivibrator or one-shot circuit involves the generation of a pulse whose width is based on the time constant of a resistor-capacitor network. The width of the pulse generated by this method is dependent on the product of the values of the resistor and capacitor used in the circuit and their variation with environmental conditions. Additional pulse width variation results from fluctuations in supply voltages.

Techniques utilizing a pulse counter and comparator accept the value of $n$ in binary form in a parallel register of length $\log_2 n$. The contents of each bit of this register are combined in an OR gate such that if any bit is a logical "1," the output is a logical "1." The output of this OR gate is used to gate the reference clock signal of frequency $f$ into the pulse counter. When the count is equal to $n$, the contents of the parallel register, the comparator generates a pulse which resets each bit of the parallel register to logical "0." This causes the output of the OR gate to become a logical "0," inhibiting the reference clock signal at the input of the counter. The output of the OR gate is then the desired pulse of width $n/f$. This method requires a complete $\log_2 n$ bit comparator with a minimum of two levels of logic circuitry and thus two gate delays between the count of $n$ and the reset of the parallel register. If $n$ is available only in decimal or unit form, a complex conversion to binary must be made to place the value of $n$ in the parallel register.

SUMMARY OF THE INVENTION

The present invention provides a significant improvement over the circuits described above by generating pulses of width $n/f$ where $n$ is any positive integer and $f$ is the frequency of a reference clocking signal. To achieve this result, an embodiment is disclosed wherein the unit $n$ is placed in a parallel register by the closing of switches. The parallel register retains this unit $n$ until it is reset by a counter and a combination of NAND gates, the register supplying the pulse width.

OBJECTS OF THE INVENTION

It is the general object of the present invention to provide an improved pulse generator.

Another object of the present invention is to provide an improved pulse generator having a variable pulse width.

Yet another object of the present invention is to provide a pulse generator providing pulses of precise width.

A still further object of the present invention is to provide a pulse generator capable of accepting the desired pulse width in decimal or unit form without conversion to binary.

A still further object of the present invention is to provide an accurate pulse generator requiring fewer components.

Further objects of the present invention will become apparent with the following detailed description and taken in view of the appended drawing in which:

The FIGURE is a schematic illustration embodying the novel pulse generator of the present invention.

DESCRIPTION OF THE PREFERRED EMBODIMENT

The pulse generator of the present invention as disclosed in the FIGURE includes a clock circuit (not shown) which produces a pulse train having a certain pulse repetition rate $f$ at terminal 22. The clock signal is coupled to counter 11 via NAND-gate 21 and to register 17 via NAND-gate 23. Counter 11 is coupled to register 17 via logic circuitry 16 and register 17 is coupled to NAND-gate 21 via NAND-gate 18. NAND-gate 18 also supplies the desired output pulses at terminal 20. Register 17 includes a plurality of flip-flops 24 through 32, each representing a number in descending order, though any desired number may be utilized. Coupled to the register flip-flop's are switches 42 through 50, one switch coupled to one flip-flop. When one of the switches 42 through 50 is set, electrically or mechanically, it sets its respective flip-flop 24 through 32 through respective NAND-gates 33 through 41. The $\overline{Q}$ output of the flip-flops 24 through 32 is supplied to their respective switches 42 through 50 and to NAND-gate 18.

Counter 11 comprises flip-flops 12 through 15 and is coupled to register 17 via logic circuitry 16 on leads 51, 52, 54, 55, 57, 58, 61, 62 and 64 and NAND-gates 53, 56, 58, 60 and 63.

In operation, the desired pulse width is entered into parallel register 17 by closing one of the switches which results in placing a logical "1" on the D input of the corresponding flip-flop in register 17. This is accepted by the flip-flop at the next clock pulse from NAND-gate 23, thus automatically synchronizing the operation. The switch closing is gated to the D input of the flip-flops 24 through 32 by the $\overline{Q}$ output of the flip-flop through its respective NAND-gate 33 through 41. Thus, once switch contact is made and a logical "1" is accepted, the D input is latched and thus impervious to any type of switch bounce in switches 42 through 50.

Once a flip-flop is set by a respective switch, its Q output is a logical "1" and its $\overline{Q}$ output a logical "0." All The $\overline{Q}$ outputs are gated into NAND-gate 18 and thus if any contains a logical "0," the output of NAND-gate 18 is a logical "1.

The output of NAND-gate 18 gates the reference clock signal to the pulse counter 11 by means of NAND-gate 21. As the counter 11 accumulates clock pulses, its outputs are combined in combinatorial logic circuitry 16 with each output 51, 52, 54, 55, 57, 59, 61, 62 and 64 going to the clear inputs of flip-flops 24 through 32. When the count of $n$, as set by switches 42 through 50, is counted by counter 11, the flip-flop corresponding to the switch representing $n$ is reset, the output of NAND-gate 18 returned to the logical "0" and the clock input to the counter via lead 19 and NAND-gate 21 is inhibited. The output of NAND-gate 18 is then a positive pulse on lead 20 of width $n/f$.

As an example, assuming a pulse of width $n/f$ representing $5/f$ units of time were desired. Prior to setting a switch, NAND-gate 18 would have a logical "0" output, since the $\overline{Q}$ of flip-flops 24 through 32 would be at a logical "1" state. Upon closing switch 46, NAND-gate 37 would cause the D input of flip-flop 28 to be at a logical "1" state. The next clock pulse from terminal 22 through NAND-gate 23 lets flip-flop 28 accept its new stable state and its output becomes a logical "0." NAND-gate 18 output thus " a logical "1" which starts the output pulse on terminal 20. The logical "1" state on lead 19 lets NAND-gate 21 pass clock pulses to counter 11 which then begins to count on flip-flops 12 through 15. Upon reaching a digital count of 101(5), the Q outputs from flip-flops 13 and 15 cause NAND-gate 56 to produce a clear signal on lead 57 to flip-flop 28. This resets the $\overline{Q}$ output from flip-flop 28 to a logical "1," and NAND-gate 18 output to a logical "0,"thereby stopping the count by counter 11, and terminating the output pulse on lead 20 at a pulse width of $n=5/f$.

The herein described invention provides a circuit for accepting the desired pulse width in terms of $n$ directly in decimal or unit form without conversion to binary. The value of $n$ is accepted independently of any contact bounce. To detect the accumulation of $n$ pulses, a complete comparator is not required since outputs can be generated for each count with only the recognition of a count of $n$ having any effect. This greatly reduces the required logic and associated delays.

The logical circuitry described above could be replaced by AND and OR gates or any other commonly used gates without any significant effect on operation or use.

Accordingly, while disclosing certain preferred embodiments of the invention, it will be apparent to those skilled in the art to which the invention pertains, that variations in the particular details of construction which have been illustrated and described may be resorted to without departing from the spirit or scope of the invention as defined in the appended claims.

What is claimed and desired to be secured by Letters Patent of the United States is:

1. A pulse generator comprising:

a source of clock pulses;

a counter coupled to said source;

a register comprising a plurality of flip-flops coupled to said counter and said source;

switching means coupled to said register for storing a number in said register; and logic means coupled between said counter and said register for resetting said register upon said counter reaching the number stored in said register;

said register supplying a pulse having a width proportional to said stored number upon being reset by said logic means.

2. A pulse generator as recited in claim 1 wherein said switching means comprises a plurality of switches, one switch coupled to a respective flip-flop; and a first NAND gate coupled to one output of all of said flip-flops;

whereby said first NAND gate output supplies said pulse upon the setting of any of said switches.

3. A pulse generator is recited in claim 2 wherein said logic means comprises a plurality of NAND gates;

wherein said register is coupled to said counter via said first NAND gate and a second NAND gate; and wherein said source is coupled to said counter via said second NAND gate.

4. A pulse generator as recited in claim 3 including:

a gate coupled between each of said switches and its respective flip-flop, said one output from said flip-flops coupled to said gate.